United States Patent [19]
Palmer

[11] 3,869,505
[45] Mar. 4, 1975

[54] DL-2-(4-HYDROXYPHENYL)-GLYCINE-N,O-DIACETATE AND SALTS

[75] Inventor: Derek Reginald Palmer, Wirral, England

[73] Assignee: Beecham Group Limited, Brentford, England

[22] Filed: Sept. 20, 1971

[21] Appl. No.: 182,190

[30] Foreign Application Priority Data
Sept. 24, 1970 Great Britain.................... 45463/70
Sept. 24, 1970 Great Britain.................... 45460/70
Sept. 24, 1970 Great Britain.................... 45461/70

[52] U.S. Cl.......... 260/479 R, 260/501.11, 260/519
[51] Int. Cl......................................... C07c 103/28
[58] Field of Search............ 260/479 R, 519, 501.11

[56] References Cited
UNITED STATES PATENTS
3,553,258  1/1971  Kaiser et al........................ 260/519
3,717,673  2/1973  Bernardi et al..................... 260/519
3,778,463  12/1973  Gronowitz et al............. 260/471 A
3,803,213  4/1974  Weber et al...................... 260/479 R Primary Examiner—James A. Patten

[57] ABSTRACT

DL-2-(4-Hydroxyphenyl)-glycine is resolved into optically-active forms by forming an N,O-diacyl derivative of 2-(4-hydroxyphenyl)-glycine, preferably an acetyl derivative, forming diastereomeric salts thereof with dehydroabietylamine and separating such salts by crystallisation, followed by decomposition and hydrolysis.

N-Acetyl-2-(4-acetoxyphenyl)-glycine is claimed as a new compound as also are the dehydroabietylamine salts of such compound and of N-acetyl-2-(4-hydroxyphenyl)-glycine.

5 Claims, No Drawings

DL-2-(4-HYDROXYPHENYL)-GLYCINE-N,O-DIACETATE AND SALTS

This invention relates to a new process for the resolution of DL-2-(4-hydroxyphenyl)-glycine in order to isolate therefrom at least one of the optically-active forms of the compound, namely (−)-2-(4-hydroxyphenyl)-glycine and/or (+)-2-(4-hydroxyphenyl)-glycine.

2-(4-Hydroxyphenyl)-glycine is an α-amino-acid that is not known to occur naturally. It therefore finds use as a chemical reference compound and as a potential intermediate in the syntheses of novel peptides. It may also be used to prepare penicillin and cephalosporin derivatives, see British Patent Specifications Nos. 1,241,844 and 1,240,687. As such the 2-(4-hydroxyphenyl)-glycine is often required in one of its two optically-active forms, particularly the D-(−)- form, but normally it is synthesised in its racemic DL-(±)- form.

It has now been found that DL-2-(4-hydroxyphenyl)-glycine is very conveniently resolved not by any treatment of the compound itself by one of the normal methods used to resolve racemic mixtures, but by first converting the compound to an acyl derivative and then resolving such derivative. It has further been found that resolution of such acyl derivatives, either the N-acyl or N,O-diacyl derivative, is very advantageously carried out by fractionally crystallising diastereomeric salts thereof with dehydroabietylamine which is an optically-active amine derived from natural sources. Such process works particularly well when acetyl derivatives of 2-(4-hydroxyphenyl)-glycine are employed, for example when N-acetyl-2-(4-acetoxyphenyl)-glycine is employed, which compound has not, it is believed, hitherto been prepared.

Accordingly, from one aspect, the present invention consists in a process for the preparation of 2-(4-hydroxyphenyl)-glycine in an optically-active form wherein an N-acyl and/or N,O-diacyl derivative of DL-2-(4-hydroxyphenyl)-glycine is treated with dehydroabietylamine to form diastereomeric salts which are separated by crystallisation; at least one of such separated salts is then decomposed and the resulting optically-active acyl derivative is hydrolysed to produce optically-active 2-(4-hydroxyphenyl)-glycine.

The acyl derivative for use in the process of the invention is normally made by reacting DL-2-(4-hydroxyphenyl)-glycine with an excess of an acylating agent, such as an acid anhydride or acyl chloride to prepare the desired N-acyl or N,O-diacyl derivative. Such reaction may be carried out as the final stage of a process for preparing 2-(4-hydroxyphenyl)-glycine without isolation thereof. Alternatively a 2-(4-acyloxyphenyl)-glycine may be reacted with an acylating agent when, as is preferred, the N,O-diacyl derivative is to be employed according to the invention. The preferred acyl derivatives are the acetyl derivatives, but other acyl derivatives, such as the formyl, propionyl, benzoyl and phenylacetyl derivatives, may also be employed. When the N-mono-acyl derivatives are to be used, these are often conveniently prepared by partial hydrolysis with mild alkali of an initially prepared N,O-diacyl compound.

N-Acetyl-2-(4-acetoxyphenyl)-glycine is an important starting material for the preferred process of the invention. This compound, hitherto unknown, constitutes a further aspect of the invention, both in its racemic and optically-active forms having $[\alpha]_{546}^{20} \pm 217°$ (C,1: methanol) and m.p. 219°C, the latter being obtainable as an intermediate in the process of the invention.

In the process of the invention a DL-acyl derivative of 2-(4-hydroxyphenyl)-glycine is treated with dehydroabietylamine. This amine is derived from natural sources, e.g., from tree rosin, and is optically-active. Consequently diastereomeric salts are formed with the acyl derivative and it was found that these could very readily be separated by fractional crystallisation so that the use of dehydroabietylamine as a resolving agent for the acyl derivative is a more satisfactory process to operate than one in which the more conventional diastereomeric derivatives of 2-(4-hydroxyphenyl)-glycine itself are sought to be prepared and separated.

While a crude product of tree rosin containing dehydroabietylamine and other amines, for example as sold by Hercules Inc. under the trade name Amine D, can be employed for present purposes, it is prefered that this should first be purified, for example by the preparation of various salts, particularly the acetate, which are then recrystallised from suitable solvents, before decomposition with alkali followed by solvent extraction. It has, however, now been found that purification is very conveniently carried out by preparing a carbon dioxide adduct of dehydroabietylamine. This adduct is prepared by dissolving the amine, which can be in the crude state, in a solvent which does not react with carbon dioxide, lower alcohols such as methanol being specially suitable. Carbon dioxide is than passed into the solution until precipitation is complete. The adduct is filtered off and washed with fresh solvent, preferably methanol, to yield an optically pure product. The adduct is preferably used as such in the process of the invention, but otherwise the adduct can be decomposed by heating it to about 60°C, either alone or in the presence of a solvent, or at ambient temperature by treatment with an alkali or an organic or inorganic acid.

The diastereomeric salts are prepared by treating the acyl derivative with dehydroabietylamine or its carbon dioxide adduct in a suitable solvent such as the lower monohydric alcohols, methanol being especially suitable. Equimolar proportions or a small excess of the amine can be employed, but it is preferred to use substantially a stoichiomeric deficiency of the amine or its adduct, especially a half molar proportion thereof. The solution containing the formed diastereomeric salts is then concentrated if necessary and allowed to crystallise when it is found that one isomer, usually that having a positive optical rotation, preferentially crystallises. However, by seeding a super-saturated solution with a crystal of the desired diastereomeric salt, the solution can be induced to crystallise to obtain crystals of either of the diastereomeric salts.

The crystals are separated and recrystallised, for example from lower alcohols such as methanol, to obtain an optically pure salt. Such salts of dehydroabietylamine and the N-acyl and N,O-diacyl derivatives of 2-(4-hydroxyphenyl)-glycine are novel compounds. Accordingly, the salts of dehydroabietylamine with N-acetyl-2-(4-acetoxyphenyl)-glycine and with N-acetyl-2-(4-hydroxyphenyl)-glycine each either as a racemic or optically-active form constitute further particular aspects of the present invention.

After separation of the formed crystals the mother liquor can be treated to recover the other diastereomeric salt by further recrystallisation, preferably after addition of a seed crystal of the diastereomeric salt remaining in solution in excess. When a stoichiomeric deficiency of amine has been employed the mother liquor is conveniently treated with a further quantity of dehydroabietylamine or its adduct whereupon the solution will contain an excess of the diastereomeric salt which did not first crystallise, and this salt will now crystallise out on evaporation, though preferably a seed crystal of such salt is added to induce crystallisation. In this case more than the excess quantity of the diastereomeric salt present will crystallise out and after removal of the formed crystals, a further quantity of amine can be added and further crystallisation of salt induced when a further quantity of the first obtained salt crystals will be obtained. In this way the two diastereomeric salts may each be obtained alternatively. Thus the process can virtually be a continuous one with addition as required of further quantities of the racemic acyl derivative.

After purification of the diastereomeric salt crystals, these are decomposed with aqueous alkali and the liberated dehydroabietylamine removed, for example by solvent extraction, e.g., with ether, benzene, toluene, methylene dichloride or hexane. The amine can be recovered and reused, preferably after purification by forming the carbon dioxide adduct thereof. The liberated optically-active acyl derivative is precipitated on acidification of the alkaline solution in an optically pure form, which can if desired be recrystallised, for example from methanol.

Finally, the acyl derivative is hydrolysed by alkali or acid, preferably by boiling with aqueous hydrochloric acid to yield a solution which on neutralisation yields an optically pure form of 2-(4-hydroxyphenyl)-glycine with $[\alpha]_{546}^{20} \pm 130°$ (C,1: water), which can if desired be recrystallized.

Since it is the (−)- form of 2-(4-hydroxyphenyl)-glycine which finds most use, particularly in the production of useful penicillins and cephalosporins, the (+)- form is not particularly desired. After separation this may be racemised to reform the DL- form, for example by boiling of the compound in sodium hydroxide solution for 1 − 6 hours, whereafter the process of the invention can be repeated to produce further quantities of the desired (−)- isomer.

The invention is illustrated by the following Examples.

EXAMPLE 1

A crude extract of tree rosin containing dehydroabietylamine and other amines, as sold by Hercules Inc. under the Trade Name Hercules Rosin Amine D, (2kg.) was dissolved in methylated spirits (10 l.) and gaseous carbon dioxide passed into the solution until precipitation was complete. The precipitated solid was filtered, triturated with fresh methylated spirits (5 l.) and refiltered. After drying at room temperature a pure dehydroabietylamine-carbon dioxide adduct was obtained (650 g.) of $[\alpha]_{546}^{20}$ (C,1: methanol) + 42°.

DL-2-(4-Hydroxyphenyl) glycine (167 g, 1.0 mole) was dissolved in water (1 l.) containing sodium hydroxide (160 g, 4 mole), the solution cooled to 0° − 5°C and acetic anhydride (250 g, 2.5 mole) rapidly added whilst maintaining the temperature below 5°C. After a further 30 minutes stirring, the mixture was acidified and DL-N-acetyl-2-(4-acetoxyphenyl)-glycine filtered off (220 g) 88% yield, m.p. 216°C.

The dehydroabietylamine-carbon dioxide adduct (330 g) was dissolved in methylated spirits (4 l.) by boiling and to this solution was added the DL-N-acetyl-2-(4-acetoxyphenyl)-glycine (420 g.) with stirring until solution was complete. This solution was seeded with an optically pure sample of the required salt, preferably the salt of (−)-N-acetyl-2-(4-acetoxyphenyl)-glycine and dehydroabietylamine (42 g.) and the mixture left overnight to crystallise. The resulting crystals were filtered and washed with methylated spirits to yield the required salt (270 g.) of specific rotation $[\alpha]_{546}^{20}$−50° (C,1: methanol). Recrystallisation of the foregoing salt from a minimum of methylated spirits yielded the salt of (−)-N-acetyl-2-(4-acetoxyphenyl)-glycine and dehydroabietylamine (200 g.) of specific rotation $[\alpha]_{546}^{20}$ −66° (C,1: methanol).

This diastereomeric salt was stirred with 10% sodium carbonate in the presence of ether and filtered to remove the liberated dehydroabietylamine and any resulting carbon dioxide adduct and the resulting aqueous solution acidified to pH 2 to precipitate a material which after recrystallisation from aqueous alcohol afforded pure (−)-N-acetyl-2-(4-acetoxyphenyl)-glycine $[\alpha]_{546}^{20}$ −216° (C,1:methanol).

The foregoing pure (−)-N-acetyl-2-(4-acetoxyphenyl)-glycine (25 g.) was heated under reflux in 6N hydrochloric acid (250 ml.) for 2 hours and the solution evaporated to dryness. The resulting solid was dissolved in water (50 ml.) and brought to pH 6.5 by the addition of 4N sodium hydroxide. The resulting precipitate was washed with water and dried to yield pure (−)-2-(4-hydroxyphenyl)-glycine (13 g.), $[\alpha]_{546}^{20}$ − 130° (C,1: water).

EXAMPLE 2

Example 1 was repeated, but the DL-N-acetyl-2-(4-acetoxyphenyl)-glycine was prepared as follows:

In a round bottomed flask fitted with a reflux condenser and mechanical stirrer was placed water (600 ml.), ammonia solution (77 ml. of S.G.0.880), ammonium bicarbonate (150 g.) and 4-hydroxybenzaldehyde (183 g.). The mixture was stirred for 15 minutes at ambient temperature and sodium cyanide (80 g.) and sodium hydroxide (9 g.) then added. The whole was warmed to 45°–50°C whereupon an exotherm occurred taking the temperature to 60°C or slightly above. This temperature was maintained by gentle heating for 4 hours, after which acetone (25 ml.) was added and the mixture refluxed for thirty minutes. A solution of sodium hydroxide (275 g.) in water (650 ml.) was then added and the resulting dark brown solution refluxed for 18 hours while a stream of nitrogen was passed through it.

The refluxed solution, containing DL-2-(4-hydroxyphenyl)-glycine was cooled and taken to pH 10.0 − 10.5 with concentrated hydrochloric acid. The solution was held at this pH during the addition of acetic anhydride (200 g.) using 50% w/v sodium hydroxide solution. Further acetic anhydride (160 g.) was then added causing the pH to fall to 7.0 − 7.2, the temperature being held below 20°C throughout the acetic anhydride additions. The reaction mixture was stirred for 30 minutes and then taken to pH 6.0 with hydrochloric acid. This solution was carbon treated and acidified to pH 1.0 to precipitate N-acetyl-2-(4-acetoxyphenyl)-glycine as an off-white granular solid. After stirring for one hour the product is filtered off, washed and dried at 60°C. Yield = 320–330 g. (86–88%).

EXAMPLE 3

Example 1 was repeated but using dehydroabietylamine itself. This was prepared in a pure form from the carbon dioxide adduct as described in Example 1 by treating the adduct with sodium hydroxide solution and removing the liberated amine by extraction with toluene or methylene dichloride.

The purified dehydroabietylamine (285 g.) was used instead of the adduct to form salts with the DL-N-acetyl-2-(4-acetoxyphenyl)-glycine and there was obtained in identical fashion the salt of (−)-N-acetyl-2-(4-acetoxyphenyl)-glycine and dehydroabietylamine (195g.) of specific rotation $[\alpha]_{546}^{20}$ −66° (C,1: methanol).

EXAMPLE 4

DL-N-acetyl-2-(4-hydroxyphenyl)-glycine was prepared by boiling a solution of DL-N-acetyl-2-(4-acetoxyphenyl)-glycine (250 g, 1.0 mole) as prepared in Example 1 in water (2 l.) containing sodium carbonate (150 g, 1.5 moles) for 1 hour. The solution was cooled and acidified with concentrated hydrochloric acid to pH 3.5 and the product filtered and washed with water to yield DL-N-acetyl-2-(4-hydroxyphenyl)-glycine (150 g.) 75% yield.

The adduct of dehydroabietylamine and carbon dioxide (16.4 g., 0.05 mole) was dissolved in boiling methanol and to this solution was added a hot solution of DL-N-acetyl-2-(4-hydroxyphenyl)-glycine (10.4 g, 0.05 mole) and the mixture allowed to cool. The precipitated salt of (+)-N-acetyl-2-(4-hydroxyphenyl)-glycine and dehydroabietylamine was filtered off and used for the preparation of (+)-2-(4-hydroxyphenyl)-glycine as described below. The residual methanolic filtrate was evaporated to dryness to furnish a crude solid which was boiled with aqueous sodium carbonate solution to liberate the dehydroabietylamine as a brown oil. The resulting aqueous liquors were adjusted to pH 2 with concentrated hydrochloric acid and the resulting precipitate filtered, washed with water and dried to yield optically pure (−)-N-acetyl-2-(4-hydroxyphenyl)-glycine (5.2 g.), 50% yield, $[\alpha]_{546}^{20}$ − 271° (C,1: methanol).

The pure diastereomeric (+)-N-acetyl-2-(4-hydroxyphenyl)-glycine dehydroabietylamine salt was stirred with aqueous alkali in the presence of ether to remove the liberated dehydroabietylamine and the resulting aqueous solution acidified to pH 2 to yield, after washing with water, pure (+)-N-acetyl-2-(4-hydroxyphenyl)-glycine $[\alpha]_{546}^{20}$ +271° (C,1: methanol).

The pure (−)-N-acetyl-2-(4-hydroxypehnyl)-glycine (21 g.) was heated under reflux in 6N hydrochloric acid (250 ml.) for 2 hours and the solution evaporated to dryness. The resulting solid was dissolved in water (50 ml.), brought to pH 6.5 by the addition of 4N-sodium hydroxide and the resulting precipitate washed with water and dried to yield pure (−)-2-(4-hydroxyphenyl)-glycine (12.5 g.), $[\alpha]_{546}^{20}$ −130° (C,1: water). Yield 74%.

EXAMPLE 5

Example 4 was repeated but a solution of the 2-(4-hydroxyphenyl)-glycine was first prepared as described in Example 2. This solution, cooled and acidified to pH 10.0 – 10.5 was treated with acetic anhydride (200 g.), the pH being kept constant at 10.0 by the simultaneous addition of sodium hydroxide solution. The reaction was stirred for 30minutes, taken to pH 12.5 by the addition of further sodium hydroxide and held at this pH and room temperature for 2 hours. Acidification to pH 6.0, carbon treatment and acidification to pH 1.0 precipitated N-acetyl-2-(4-hydroxyphenyl)-glycine. The mixture was stirred for 4 hours at 0°–10°C and the product then filtered off, washed with a little water and dried at 60°C. Yield from 4-hydroxybenzaldehyde = 190–205g (60–65%).

EXAMPLE 6

Example 4 was repeated but the N-acetyl-2-(4-hydroxyphenyl)-glycine was prepared by slurrying N-acetyl-2-(4-acetoxyphenyl)-glycine (50 g.) in water (200 ml.) and 50% sodium hydroxide solution added to a pH of 12.5 – 13.0. The resulting solution was held at this pH for 2 hours at room temperature and then taken to pH 1.0 with hydrochloric acid. N-Acetyl-2-(4-hydroxyphenyl)-glycine was rapidly precipitated and, after agitating gently for 2 hours, filtered off, washed and dried at 60°C to give a white powder. Yield = 37.5g. (89%).

EXAMPLE 7

Example 4 was repeated using 7.1 g. (0.025 mole) of dehydroabietylamine instead of the adduct of dehydroabietylamine and carbon dioxide and there was obtained in identical fashion pure (−)-N-acetyl-2-(4-hydroxyphenyl)-glycine (5.2g.), 50% yield $[\alpha]_{546}^{20}$ −271° (C,1:methanol).

EXAMPLE 8

Example 4 was repeated but the pure (−)- diastereomeric salt was treated by boiling with aqueous sodium carbonate solution to liberate the dehydroabietylamine as a brown oil. The aqueous liquors were cooled and acidified to pH 2 to yield, after washing with water, pure (−)-N-acetyl-2-(4-hydroxyphenyl)-glycine $[\alpha]_{546}^{20}$ −271° (C,1:methanol).

EXAMPLE 9

Example 1 was repeated but the pure diastereomeric salt was treated as in Example 8 to yield pure (−)-N-acetyl-2-(4-hydroxyphenyl)-glycine $[\alpha]_{546}^{20}$ −271° (C,1: methanol).

EXAMPLE 10

Dehydroabietylamine (7.1 g, 0.025 mole) was dissolved in boiling methanol (50 ml.) and to this solution was added a hot solution of DL-N-acetyl-2-(4-hydroxyphenyl)-glycine as prepared in Example 6 (10.4 g, 0.05 mole) in methanol (50 ml.) and the mixture allowed to cool. The precipitated salt of (+)-N-acetyl-2-(4-hydroxyphenyl)-glycine and dehydroabietylamine (7 g.) was filtered off and the filtrate evaporated to dryness. The resulting residue was stirred with aqueous sodium hydroxide in the presence of ether to remove residual dehydroabietylamine and the aqueous liquors were brought to pH 3.5 by the addition of concentrated hydrochloric acid. Concentration of aqueous solution to a bulk of ca. 40 ml. by rotary evaporation effected crystallisation of the pure enantiomorph (−)-N-acetyl-2-(4-hydroxyphenyl)-glycine $[\alpha]_{546}^{20}$ −271° (C,1: methanol), (5 g.). This was hydrolysed to produce (−)-

2-(4-hydroxyphenyl)-glycine by the method of Example 8.

EXAMPLE 11

Example 10 was repeated using the adduct of dehydroabietylamine and carbon dioxide (8.2 g, 0.025 mole) instead of dehydroabietylamine, and there was obtained in identical fashion the pure enantiomorph (−)-N-acetyl-2-(4-hydroxyphenyl)-glycine $[\alpha]_{546}^{20}$ −271° (C,1: methanol), (5 g.)

EXAMPLE 12

A solution of DL-2-(4-hydroxyphenyl)-glycine (16.7 g., 0.1 mole) in water (150 ml.) containing sodium hydroxide (14 g, 0.35 mole) was cooled to between 0° and 5°C and acetic anhydride (22.9 g., 0.225 mole) added gradually over a period of 1 hour at this temperature. The mixture was then stirred for a further 10 minutes and acidified with concentrated hydrochloric acid to pH 2 and the precipitated material filtered. Recrystallisation from aqueous methylated spirits afforded colourless prisms of DL-N-acetyl-2-(4-acetoxyphenyl)-glycine (22.6 g, 90% yield) of melting point 216°C.

The adduct of dehydroabietylamine and carbon dioxide (16.4g, ca 0.05 mole) was dissolved in boiling methylated spirits (100 ml.) with evolution of carbon dioxide. The resulting solution of dehydroabietylamine was added rapidly to a hot solution of DL-N-acetyl-2-(4-acetoxyphenyl)-glycine (25 g, 0.1 mole) in methylated spirits (200 ml.) and after heating under reflux for 10 minutes, the mixture was seeded with an optically pure sample of the required salt, preferably the salt of (−)-N-acetyl-2-(4-acetoxyphenyl)-glycine and dehydroabietylamine and the mixture left overnight to crystallise. The resulting crystals were filtered and washed with methylated spirits to yield a crude salt (12.5 g.) having $[\alpha]_{546}^{20}$ −51° (C,1: methanol). Recrystallisation from boiling methylated spirits (250 ml.) afforded the pure salt (9.0 g.) of (−)-N-acetyl-2-(4-acetoxyphenyl)-glycine and dehydroabietylamine having $[\alpha]_{546}^{20}$ −75° (C,1: methanol) and m.p. 194°C.

The filtrates and washings from the foregoing crude salt were combined and treated with a hot solution of dehydroabietylamine (14.2 g., 0.05 mole) in methylated spirits (50 ml.) and the mixture seeded with an optically pure sample of the salt of (+)-N-acetyl-2-(4-acetoxyphenyl)-glycine and dehydroabietylamine and the mixture left overnight to crystallise. The resulting crystals were filtered and washed with methylated spirits to yield a crude salt (15.5 g.) having $[\alpha]_{546}^{20}$ +84° (C,1: methanol). Recrystallisation from boiling methylated spirits (300 ml.) afforded the pure salt (12.1 g.) of (+)-N-acetyl-2-(4-acetoxyphenyl)-glycine and dehydroabietylamine having $[\alpha]_{546}^{20}$ +106° (C,1: methanol) and m.p. 197°C.

The foregoing pure salt of (+)-N-acetyl-2-(4-acetoxyphenyl)-glycine and dehydroabietylamine (26.7 g., 0.05 mole) was stirred with a solution of sodium hydroxide (2.4 g., 0.06 mole) in water (100 ml.) at 0° − 5°C in the presence of ether (50 ml.) until the solid had completely dissolved. The cold aqueous phase was extracted with a further portion of ether (50 ml.) and then acidified with concentrated hydrochloric acid. The precipitated solid was washed with water and re-crystallised from hot methylated spirits to yield pure (+)-N-acetyl-2-(4-acetoxyphenyl)-glycine (10.4 g., 84% yield) having $[\alpha]_{546}^{20}$ +217° (C,1: methanol) and m.p. 220°C.

Similarly, the pure salt of (−)-N-acetyl-2-(4-acetoxyphenyl)- glycine and dehydroabietylamine (26.7 g., 0.05 mole) afforded pure (−)-N.acetyl-2-(4-acetoxyphenyl)-glycine (10.1 g, 80% yield) having $[\alpha]_{546}^{20}$ −217° (C,1: methanol) and m.p. 219°C.

(+)-N-Acetyl-2-(4-acetoxyphenyl)-glycine (25 g, 0.2 mole) was heated under reflux with sodium carbonate (21 g., 0.2 mole) in water (60 ml.) for 1 hour. The solution was cooled to ambient, and concentrated sulphuric acid (19.6 g.) added, followed by concentrated hydrochloric acid (50 ml.). The resulting mixture was heated under reflux for a further 3 hours, cooled to ambient and adjusted to pH 8 by the addition of aqueous sodium hydroxide (50%). After chilling for 1 hour, the precipitated solid was filtered, washed with a little ice-cold water and recrystallised from water to yield pure (+)-2-(4-hydroxyphenyl)-glycine (11.7 g, 77%) having $[\alpha]_{546}^{20}$ +132°(C,1: water) with m.p. 237°C.

A similar procedure with (−)-N-acetyl-2-(4-acetoxyphenyl)-glycine afforded a 75% yield of (−)-2-(4-hydroxyphenyl)-glycine having $[\alpha]_{546}^{20}$ −131° (C,1: water) with m.p. 237°C.

EXAMPLE 13

A solution of dehydroabietylamine (14.2 g, 0.05 mole) in hot methanol (50 ml.) was added rapidly to a solution of DL-N-acetyl-2-(4-hydroxyphenyl)-glycine (20.9 g, 0.1 mole) in hot methanol (150 ml.) which had been prepared as in Example 4. The mixture was cooled with rapid stirring and the resulting solid filtered and washed with methanol (50 ml.) to yield a crude salt (19.8 g.) of (+)-N-acetyl-2-(4-hydroxyphenyl)-glycine and dehydroabietylamine having $[\alpha]_{546}^{20}$ +97° (C,1:methanol).

The crude salt (19.7 g, 0.04 mole) was stirred with sodium hydroxide (3.2 g, 0.08 mole) in water (50 ml.) in the presence of ether (50 ml.) and the resulting aqueous phase extracted with a further portion of ether (50 ml.) and then acidified with concentrated hydrochloric acid. After standing for 1 hour, the precipitated solid was filtered off, washed with a little water and recrystallised from hot water (20 ml.) to afford pure (+)-N-acetyl-2-(4-hydroxyphenyl)-glycine (5.1 g, ca 0.025 mole) having $[\alpha]_{546}^{20}$ +271° (C,1: methanol) with m.p. 201°C.

The filtrate and washings from the foregoing crude salt were combined together with sodium hydroxide (4.8 g, 0.12 mole) in water (100 ml.) and the bulk of the methanol present was removed by distillation below 40°C. The cooled aqueous phase was extracted with ether (2 × 50 ml.) and acidified with concentrated hydrochloric acid. After standing for 1 hour, the precipitated solid was filtered off, washed with a little water and re-crystallised from hot water (30 ml.) to afford pure (−)-N-acetyl-2-(4-hydroxyphenyl)-glycine (5.0 g, ca 0.025 mole) having $[\alpha]_{546}^{20}$ −271° (C,1: methanol) with m.p. 190°C.

The (+)-N-acetyl-2-(4-hydroxyphenyl)-glycine (21 g, 0.1 mole) was then heated under reflux with a mixture of concentrated hydrochloric acid (50 ml.) and water (50 ml.) for 2 hours. The cooled mixture was adjusted to pH 8 with aqueous sodium hydroxide (50%) and after chilling for 1 hour, the precipitated material was filtered off and recrystallised from water to afford pure (+)-2-(4-hydroxyphenyl)-glycine (14.9 g, 89%).

A similar procedure with (−)-N-acetyl-2-(4-hydroxyphenyl)-glycine afforded an 88% yield of pure (−)-2-(4-hydroxyphenyl)-glycine.

EXAMPLE 14

Example 13 was repeated but the crude salt of N-acetyl-2-(4-hydroxyphenyl)-glycine was recrystallised twice from boiling methanol (150 ml.) to afford the pure salt of (+)-N-acetyl-2-(4-hydroxyphenyl)-glycine and dehydroabietylamine having $[\alpha]_{546}^{20}$ +125° (C,1: methanol) with m.p. 253°C. The resulting pure salt (7.4 g, 0.015 mole) was treated with aqueous alkali in like manner to the foregoing crude salt and afforded after acidification and recrystallisation from water pure (+)-N-acetyl-2-(4-hydroxyphenyl)-glycine (2.5 g.).

The filtrate and washings from the foregoing crude salt were combined and heated with a solution of dehydroabietylamine (14.2 g, 0.05 mole) in methanol (50 ml.) and the mixture cooled and seeded with the pure salt of (−)-N-acetyl-2-(4-hydroxyphenyl)-glycine and dehydroabietylamine to afford a crude salt which was recrystallised thrice from boiling methanol (150 ml.) to afford the pure salt (6.9 g.) of (−)-N-acetyl-2-(4-hydroxyphenyl)-glycine and dehydroabietylamine having $[\alpha]_{546}^{20}$ −82° (C,1: methanol) with m.p. 248°C. The resulting pure salt (6 g.) was decomposed with aqueous alkali in like manner to the foregoing salts and afforded after acidification and recrystallisation from water pure (−)-N-acetyl-2-(4-hydroxyphenyl)-glycine (2.0 g.).

EXAMPLE 15

The first stages of Example 12 were repeated to obtain (+)-N-acetyl-2-(4-acetoxyphenyl)-glycine. This compound (12.5 g, 0.05 mole) was heated under reflux with sodium carbonate (10.6 g, 0.1 mole) in water (50 ml.) for 1 hour, cooled to ambient temperature and acidified with concentrated hydrochloric acid. After standing and chilling for 1 hour, the precipitated solid was filtered off and recrystallised from hot water to yield pure (+)-N-acetyl-2-(4-hydroxyphenyl)-glycine (8.7 g, 83% yield). By a similar procedure (−)-N-acetyl-2-(4-acetoxyphenyl)-glycine furnished pre (−)-N-acetyl-2-(4-hydroxyphenyl)-glycine in comparable yields. These compounds were then converted into corresponding optically-active forms of 2-(4-hydroxyphenyl)-glycine by the method of the final stage of Example 13.

EXAMPLE 16

Resolution and Cleavage of DL-N-benzoyl-2-(4-hydroxyphenyl)-glycine

To a solution of 2-(4-hydroxyphenyl)-glycine (167 g, 1 mole) in aqueous sodium hydroxide (600 ml, 2N) maintained at 5° to 10°C, was added benzoyl chloride (140 ml, 1.1 mole) in portions. During the addition the mixture was vigorously stirred and the pH maintained at 10–11 by the addition of further portions of aqueous sodium hydroxide. After completion of addition, the mixture was stirred for a further hour and acidified with cooling to pH 4 with concentrated hydrochloric acid. After stirring for a further hour the precipitate was filtered and washed with water to yield DL-N-benzoyl-2-(4-hydroxyphenyl)-glycine as an off-white solid (230 g., 85% yield). The adduct of dehydroabietylamine and carbon dioxide (16.4 g, 0.05 mole) was dissolved in boiling methanol (200 ml.) and to this solution was added a hot solution of DL-N-benzoyl-2-(4-hydroxyphenyl)-glycine (27.1 g, 0.1 mole) and the mixture allowed to cool with the addition of an optically pure sample of the required salt, preferably the salt of (−)-N-benzoyl-2-(4-hydroxyphenyl)-glycine and dehydroabietylamine (3g.) and the mixture left overnight to crystallise. The resulting crystals were filtered and recrystallised successively from hot methanol to afford in the preferred case the pure salt of (−)-N-benzoyl-2-(4-hydroxyphenyl)-glycine and dehydroabietylamine (13.5 g.) of specific rotation $[\alpha]_{546}^{20}$ −40° (C,1: methanol) and m.p. 236°C.

Treatment of the foregoing filtrate with a further hot solution of dehydroabietylamine (14.2 g, 0.05 mole) in methanol (200 ml.) followed by concentration to a volume of about 300 ml. and seeding with an optically pure sample of (+)-N-benzoyl-2-(4-hydroxyphenyl)-glycine and dehydroabietylamine (5 g.), gradually deposited material which on successive recrystallisation from hot methanol afforded the pure salt of (+)-N-benzoyl-2-(4-hydroxyphenyl)-glycine and dehydroabietylamine (12.2 g.) of specific rotation $[\alpha]_{546}^{20}$ +70 and m.p. 223°C.

The pure salt of (−)-N-benzoyl-2-(4-hydroxyphenyl)-glycine and dehydroabietylamine (14 g.) was triturated with sodium hydroxide (5g.) in water (60 ml.) in the presence of ether (40 ml.) until solution was complete. The aqueous layer were separated and extracted with a further portion of ether (40 ml.) and acidified to pH 4 with concentrated hydrochloric acid. The precipitated solid was filtered off and washed with water to yield pure (−)-N-benzoyl-2-(4-hydroxyphenyl)-glycine (6.5 g.) having a specific rotation of $[\alpha]_{546}^{20}$ − 174° (C,1: methanol).

The resulting (−)-N-benzoyl-2-(4-hydroxyphenyl)-glycine (30 g.) was dissolved in methanol (300 ml.) and heated under reflux for 30 hours whilst passing anhydrous hydrogen chloride through the mixture. The mixture was then evaporated to near dryness and the cooled residue extracted twice with ice-cold water and basified to pH 8 with sodium hydroxide (20%). The precipitated solid was filtered and recrystallised from hot water to yield pure D-(−)-2-(4-hydroxyphenyl)-glycine (9.4 g.) having a specific rotation $[\alpha_{546}^{20}$ −130° (C,1: water) with m.p. 236°C.

A similar procedure with the pure salt of (+)-N-benzoyl-2-(4-hydroxyphenyl)-glycine and dehydroabietylamine afforded pure L-(+)-2-(4-hydroxyphenyl)-glycine having a specific rotation $[\alpha]_{546}^{20}$ + 132° (C,1: water) with m.p. 237°C.

I claim:

1. DL-N-Acetyl-2-(4-acetoxyphenyl)-glycine.
2. N-Acetyl-2-(4-acetoxyphenyl)-glycine having a positive optical rotation $[\alpha]_{546}^{20}$ (C,1: methanol) of substantially +216°.
3. N-Acetyl-2-(4-acetoxyphenyl)-glycine having a negative optical rotation $[\alpha]_{546}^{20}$ (C,1: methanol) of substantially −216°.
4. A salt of dehydroabietylamine and N-acetyl-2-(4-acetoxyphenyl) glycine.
5. A salt of dehydroabietylamine and N-acetyl-2-(4-hydroxyphenyl) glycine.

* * * * *